(12) United States Patent
Hackler

(10) Patent No.: US 11,987,109 B1
(45) Date of Patent: May 21, 2024

(54) TRUCK CAP WITH FULLY OPENING ROOF DOORS

(71) Applicant: Vincent Hackler, Freeland, MD (US)

(72) Inventor: Vincent Hackler, Freeland, MD (US)

(*) Notice: Subject to any disclaimer, the term of this patent is extended or adjusted under 35 U.S.C. 154(b) by 0 days.

(21) Appl. No.: 18/366,135

(22) Filed: Aug. 7, 2023

(51) Int. Cl.
*B60J 7/04* (2006.01)
*B60J 7/02* (2006.01)
*B60J 7/10* (2006.01)
*B60P 3/32* (2006.01)
*B60P 7/02* (2006.01)

(52) U.S. Cl.
CPC ............... *B60J 7/041* (2013.01); *B60J 7/022* (2013.01); *B60J 7/106* (2013.01); *B60P 7/02* (2013.01)

(58) Field of Classification Search
CPC ..... B60J 7/106; B60J 7/04; B60J 7/041; B60J 7/08; B60J 7/12; B60J 7/1607; B60P 3/32; B60P 7/02
USPC ............. 296/3, 10, 156, 164, 191.1, 12, 102
See application file for complete search history.

(56) References Cited

U.S. PATENT DOCUMENTS

| | | | |
|---|---|---|---|
| 3,149,878 A * | 9/1964 | Heermann | B60P 3/32 296/102 |
| 3,782,776 A * | 1/1974 | Ormont | B60J 7/1642 296/100.1 |
| 5,013,078 A * | 5/1991 | Eckerd | B60P 3/42 296/100.07 |
| 6,435,594 B1 | 8/2002 | Ekonen et al. | |
| 6,505,878 B1 | 1/2003 | Mascolo | |
| 6,783,169 B1 * | 8/2004 | Marx | B60J 7/141 296/100.09 |
| 7,207,614 B2 | 4/2007 | Briggs | |
| 7,914,064 B2 | 3/2011 | Joab | |
| 8,474,896 B2 | 7/2013 | Ostberg | |
| 10,406,898 B2 | 9/2019 | O'Reilly | |
| 11,577,637 B2 * | 2/2023 | Petty | B60R 9/00 |
| 2004/0164578 A1 | 8/2004 | Mack et al. | |

* cited by examiner

*Primary Examiner* — Dennis H Pedder
(74) *Attorney, Agent, or Firm* — Caesar Rivise, PC

(57) ABSTRACT

Invention is an improved vehicle cover typically used as a truck cap with roof doors that can fully expose cargo bed while the roof doors remain attached to the truck cap. The embodiment generally consists of two roof doors that meet in a substantially central location on the top of the truck cap, resting on or near the front and rear support beams. In addition, the embodiment maintains rack and truck cap side panel functionalities for windows or tool storage boxes.

17 Claims, 5 Drawing Sheets

TRUCK CAP WITH FULLY OPENING ROOF DOORS

CROSS-REFERENCE TO RELATED APPLICATIONS

This application claims the benefit of provisional patent application Ser. No. 63/521,058, EFS ID 48155144 filed 2023 Jun. 14 by the present inventor.

FIELD OF INVENTION

The present invention relates generally to vehicle cargo beds, and more specifically to covers that enclose cargo beds for vehicles such as pickup trucks.

RELEVANT PRIOR ART INCLUDES

U.S. Pat. No. 8,474,896, Ostberg
U.S. Pat. No. 6,435,594, Ekonen and Wohlfield
U.S. Pat. No. 10,406,898, O'Reilly
U.S. Pat. No. 7,207,614, Briggs
U.S. Pat. 2004/0164578, Mack, Moore, Fielding
U.S. Pat. No. 6,505,878, Mascolo
U.S. Pat. No. 7,914,064, Joab

BACKGROUND OF THE INVENTION

Truck caps, racks and tonneau covers have been around for many years as add-ons to pickup trucks. Their existence can improve functionality and increase the number of hauling uses for vehicles such as pickup trucks. Tonneau covers and truck caps allow for increased storage flexibility and protection of items in the cargo bed from inclement weather while also increasing security.

Tonneau covers are convenient when transporting loads that require convenient removal of their cover as many tonneau covers can simply convert to open cargo beds. However, the majority of tonneau covers limit loads to the height of the cargo bed walls. Some tonneau covers have the ability to raise above cargo bed walls, but those embodiments typically have open air sides and/or do not have rack features when raised above the cargo bed side. Therefore, tonneau covers encounter limitations when trying to protect taller items such as an object or container exceeding the height of the cargo bed. Hauling lighter weight loads which have heights that may exceed the cargo bed sides such as brush clippings can also prove difficult with tonneau covers.

Compared to tonneau covers, truck caps function more efficiently when cargo exceeds the height of the cargo bed up to the height of the truck cab. However, removing a truck cap entirely from the cargo bed is more cumbersome than that of a tonneau cover, making them less effective when transporting, loading, and unloading more dense materials such as dirt, stone, or mulch. In addition, the majority of truck caps are approximately the height of the truck cab which requires most individuals to bend in uncomfortable positions while loading and unloading items from the covered cargo bed.

Over time, several improvements have been made to both tonneau and truck caps allowing them to convert into multiple positions. Additionally, some truck caps include a single, removable roof panel. Yet, there are still multiple drawbacks of each.

BRIEF SUMMARY OF INVENTION

A truck cap with roof doors that fully open while remaining attached to the truck cap and maintaining rack and truck cap side panel functionalities is advantageous over prior art. The embodiment generally consists of two roof doors that meet in a substantially central location on the top of the truck cap, resting on or near the front and rear support beams. One of varying roof opening methods may be assigned to a specific truck cap. In one embodiment, the hinges allow for each roof door to fully open to a substantially 270 degree angle so each of said roof doors fold over and attach to truck cap side panels using known latch or securing mechanisms. In another embodiment, the roof doors slide along a track built into or attached the top support beam and along the side support member or exterior of the side panel of the truck cap so the roof doors are substantially parallel to the truck cap side panels.

Advantages

The current invention focuses on the truck cap roof primarily as a multi facet door opening apparatus instead of only a permanent or a removable single panel roof, making it superior to prior art and providing the following advantages.

(a) Complete opening of a roof door makes the truck cap more versatile as it allows individuals to load and unload pickup cargo beds with greater physical ease. Attached roof doors allow an individual to more conveniently open and close the roof cap door while loading and unloading the cargo bed, lessening the need to bend the individual's body in uncomfortable positions. Keeping the truck cap side panels in place when the roof is open increases load size capabilities.

(b) Truck caps with roof doors are less awkward and fewer steps to open the roof compared to complete roof panel removal truck cap systems. The ability to keep the truck cap roof attached, makes the process more efficient for an individual and expands loading and door storage options.

(c) Embodiments using a hinge or track as roof door opening method require less physical effort than full roof removal and require fewer steps than prior art that can convert from tonneau cover to truck cap.

(d) Truck caps with fully opening roof doors can be more efficiently integrated into existing truck cap manufacturer designs than prior art that has attempted to create conversion features. Center roll doors such as found in prior art are more costly to implement into existing truck cap manufacturer designs than the described embodiments.

(e) Unlike prior art, the present invention can accommodate integrated side truck cap tool boxes or full size truck cap side windows and allow rear access doors to remain attached to the truck cap while the truck cap is in an extended side panel, open roof mode.

(f) The additional support member and crossbeam framing improve strength and increase rack functionality when roof doors are completely open compared to other existing truck cap covers that contain conversion features.

BRIEF DESCRIPTION OF DRAWINGS

Some embodiments of the present invention are illustrated as examples but are not limited by the figures of the accompanying drawings, in which references may indicate similar elements.

DRAWINGS—REFERENCE NUMERALS

Figure 1:
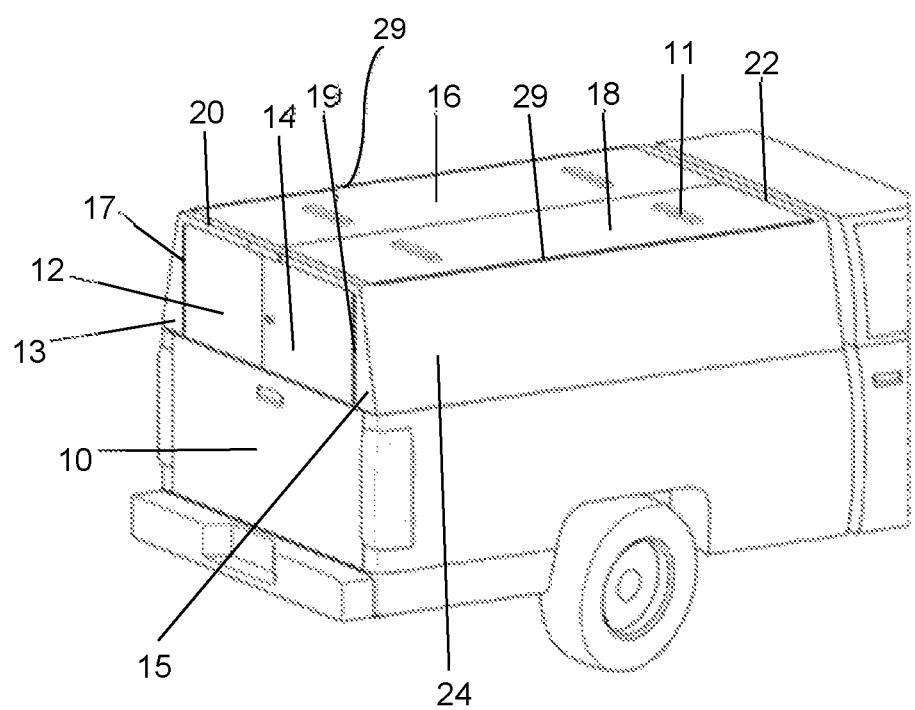
FIG. 1 depicts the view of the present invention in a fully enclosed state and situated upon the truck cargo bed using a fold over hinge method for the roof doors.

10—tailgate
11—buffer pad
12, 14—rear access cap door
13, 15—door attachment bridge
16, 18—single pane roof cap door
17, 19—rear access hinge and pins
20, 22—front and rear cross beam
21, 23—side cross beam
24, 27—side panel
25—end panel
26—interior locking mechanism
28—additional cross beam
29—roof door hinge
30, 32, 34, 36—leg support member
37, 39—bifold roof door
40—interior door track
42, 44—exterior door track

DETAILED DESCRIPTION AND OPERATION OF THE INVENTION

The terminology used herein is for the purposes of describing particular embodiments only and is not intended to be limiting of the invention. As used herein, the term "and/or" includes any and all combinations of one or more of the associated listed items. As used herein, the singular form "a," "an," and the "the" are intended to include the plural forms as well as singular forms unless the context clearly indicates otherwise. It will be further understood that the terms "comprises" and/or "comprising when used in this specification, specify the presence of stated features, steps, operations, elements, and/or components, but not to preclude the presence or addition of one or more other features, steps, operations, elements, components, and/or groups thereof.

In describing the invention, it will be understood that a number of techniques and steps are disclosed. Each of these has individual benefits and each can also be used in conjunction with one or more, or in some cases all, of the other disclosed techniques. Accordingly for the sake of clarity this description will refrain from repeating every possible combination of the individual steps in an unnecessary fashion. Nevertheless, the specification and claims should be read with the understanding that such combinations are entirely within the scope of the invention and claims.

New truck cap devices, apparatuses, and methods for truck cover conversions are discussed herein. In the following description for purposes of explanation, some specific details are set forth in order to provide a thorough understanding of the present invention. It will be evident, however, to one skilled in the art that the present invention may be practiced without these specific details.

The current embodiment has a frame that comprises or consists of a first leg support member 36 positioned near the front side corner of the cargo bed and a second leg support member 32 positioned near the opposing second front side corner of the cargo bed. A third leg support member 34 is positioned near the third rear side corner of the cargo bed and a fourth leg support member 30 is positioned near the opposing fourth rear side corner of the cargo bed. Cross beams 20, 21, 22, 23 are then attached to leg support members 30, 32, 34, 36 at top of leg support members along each side so the top becomes an open substantially rectangular shape. Cross beam 20 is secured using pins 45 (FIG. 2) or other easily removable hardware so said cross beam 20 can be unattached at one end and permitted to swivel inward or outward so said cross beam 20 allowing an individual to load or unload the cargo bed free from an overhead obstruction. Additional cross beam 28 may be desired in some embodiments to enhance strength between leg support members 30, 32, 34, 36.

Side panels 24, 27 and end panel 25 are attached to the leg support members 30, 32, 34, 36 at the end of the cargo bed nearest the truck cab and along cargo bed sides so the three sides are fully enclosed. The three said panels 24, 25, 27 will consist of materials known in the manufacturing of truck cap exteriors. Leg support members 30, 34 nearest to the truck tailgate will have a door attachment bridge 13, 15 made of known exterior truck cap materials. Door attachment bridges 13, 15 will allow rear access doors 12, 14 to open, exposing the truck cap interior. The bottom portion of the truck cap panels 24, 25, 27 will use known methods to connect support legs 30, 32, 34, 36 and panels 24, 25, 27 to the cargo bed in a manner that maximizes security and weather resistance. Hardware known in the truck cap art will connect leg support members 30, 32, 34, 36 and panels 24, 25, 27 in a manner that will allow the truck cap to be placed on top of the truck cargo bed side walls. Methods known in the art will be utilized to secure the truck cap to the truck cargo bed.

Current embodiment consists of two additional rear doors 12, 14 at the tailgate 10 end of the cargo bed, meeting in a substantially central location with hinge and side pins 17,19 supporting the rear doors 12, 14, allowing for rear door 12, 14 removal when tailgate 10 is opened if desired. In one embodiment, the two rear access doors 12, 14 have capability to open at a significantly obtuse angle to maximize rear access door opening based on hardware known in the art.

The truck cap roof is comprised of two roof doors 16, 18 that allow for opening from inside or outside of the enclosed cargo bed area into a completely open roof position if desired. Latching and locking mechanisms 26 from known cellar door and garage door arts will be accessed from the interior of the truck cap from the underneath surface of the roof doors 16, 18. Functionality will permit the roof doors 16, 18 to stay connected to the truck cap structure at all times. Depending on the embodiment, roof doors will fold, or pivot and slide, so the said roof doors 16, 18 are substantially parallel to the two truck cap side panels 24, 27 using hardware known in the art. Buffer pads 11 are attached to the exterior roof doors 16, 18 in the embodiment that uses the fold over hinge method. Said buffer pads 11 will be comprised of a semi-rigid material that serves as cushion to prevent scratches and other damage to the truck cap exterior side panels 24, 27 when the truck cap roof door is completely folded over. The buffer pads 11 can be made of but not limited to materials such as plastic, foam, or cork.

Figure 2:
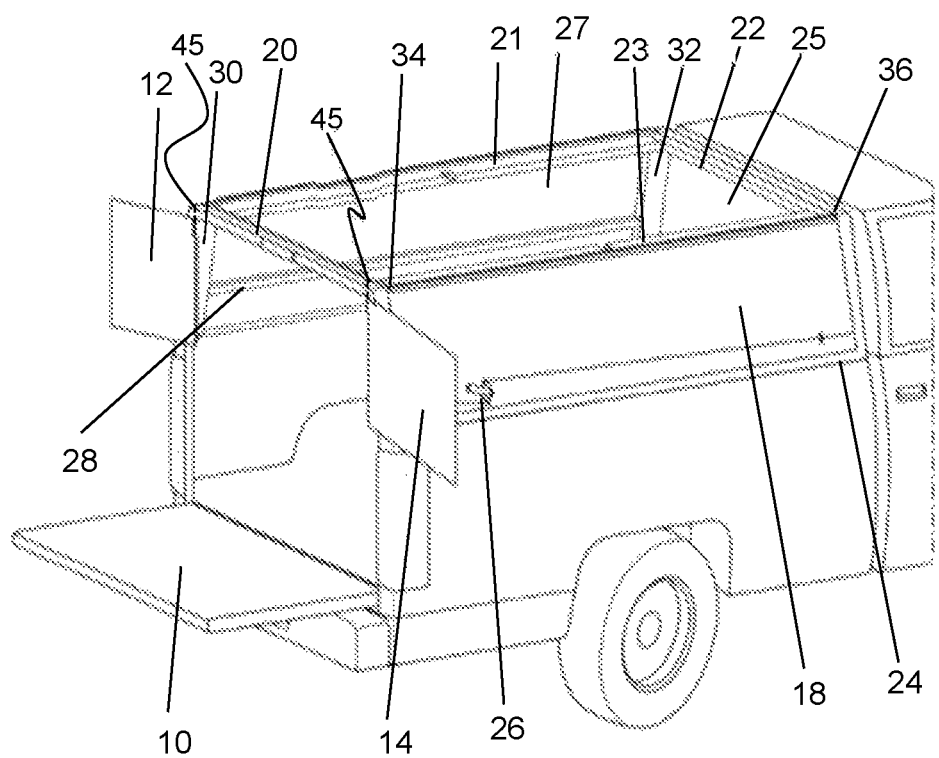
FIG. 2 depicts the view of the present invention using a fold over hinge method situated upon the truck cargo bed with all doors opened to their maximum openings and top additional substantially central roof support beam removed.
Figure 3:
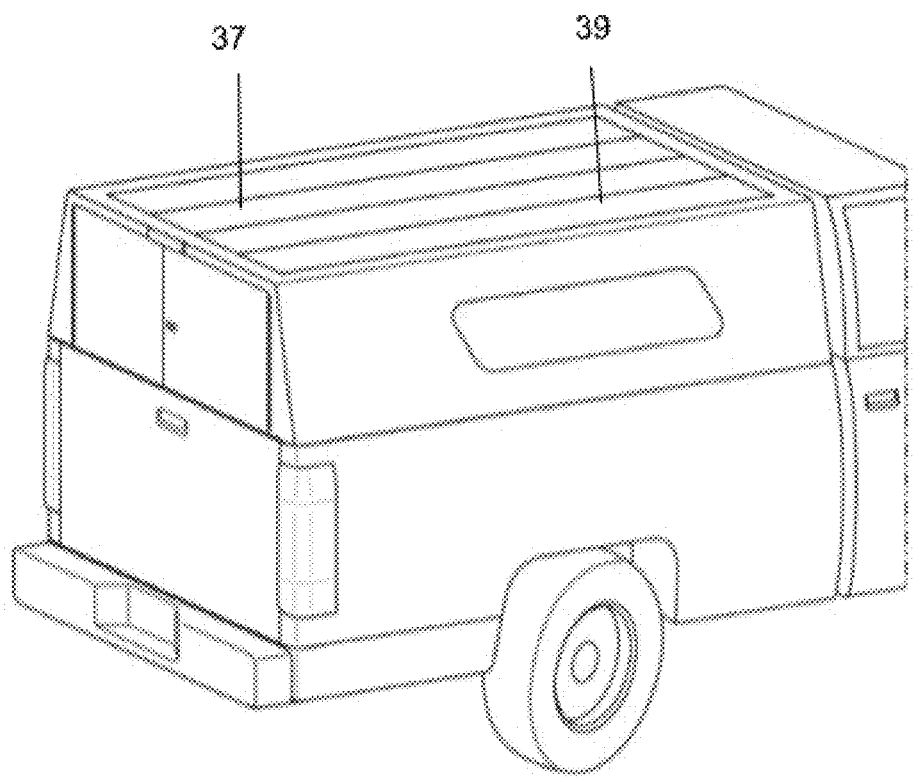
FIG. 3 depicts the view of the present invention in a fully enclosed state situated upon the cargo bed using an interior sliding track roof door method embodiment.
Figure 4:
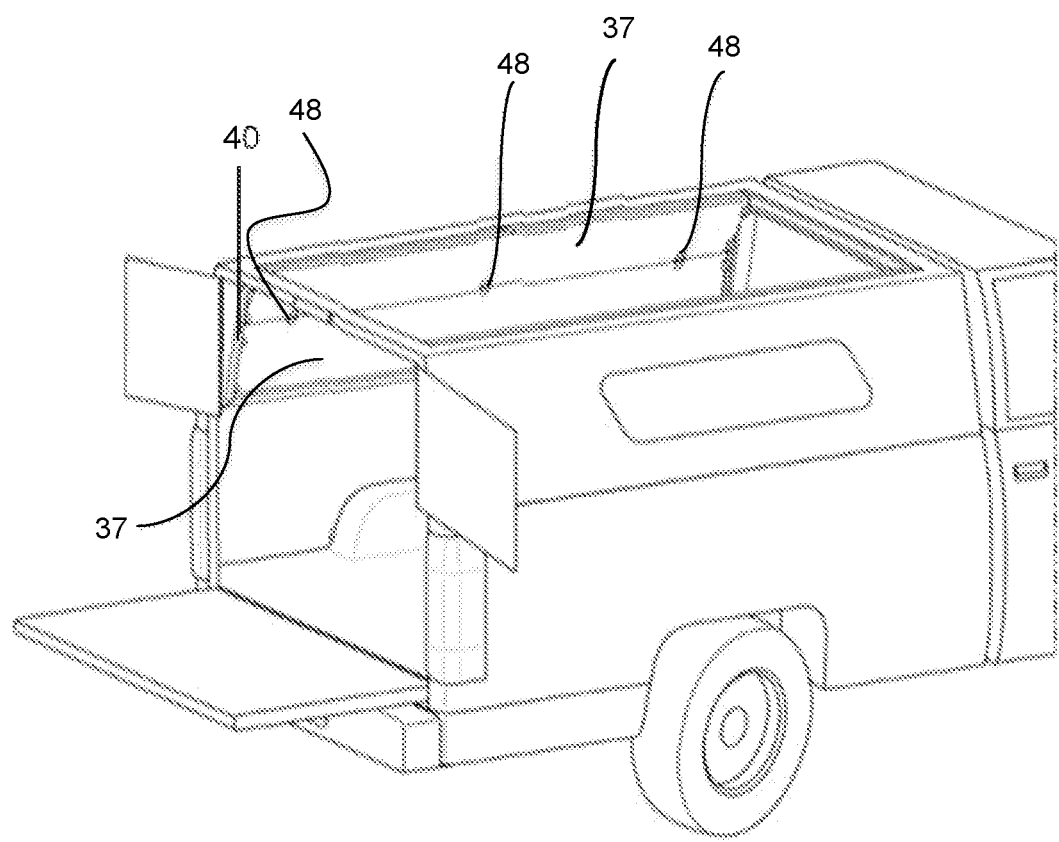
FIG. 4 depicts the view of the present invention with an interior sliding track roof door method embodiment situated upon the truck cargo bed with all doors opened to their maximum openings and top additional substantially central roof support beam removed.
Figure 5:
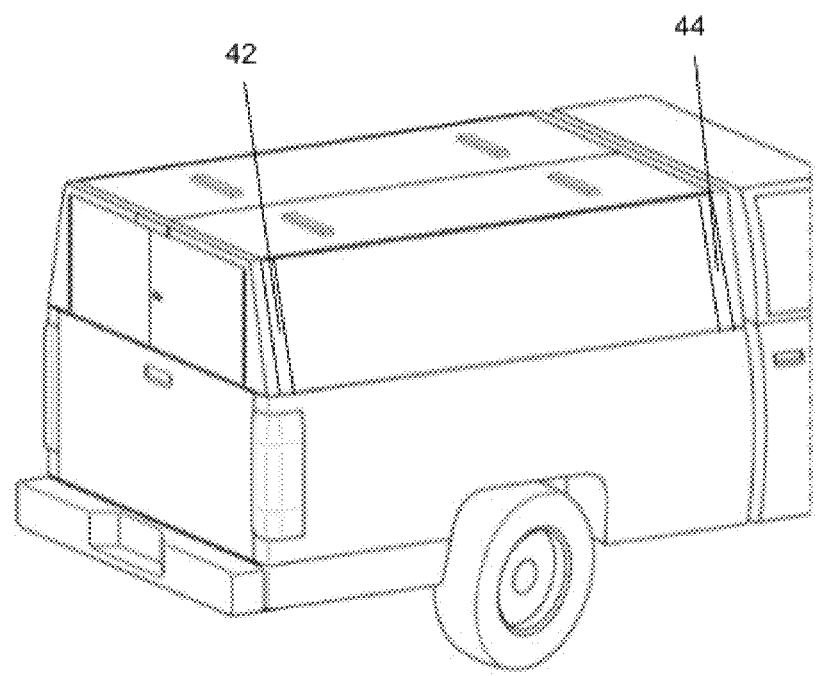
FIG. 5 depicts the view of the present invention in a fully enclosed state situated upon the cargo bed using the truck cap side panel exterior sliding track roof door method embodiment.

FIG. 1 and FIG. 2 illustrate using a hinge 29 that permits the roof doors to fold over so the said roof doors are secured to the adjacent and substantially parallel to the respective truck cap side panel 24, 27. Door attachment method, hardware, and weatherproofing will utilize those in the known tonneau cover, truck cap, and cellar door arts. FIG. 3, FIG. 4, and FIG. 5 illustrate using sliding track methods to open truck cap roof doors. FIG. 3 and FIG. 4 embodiment consist of bi-fold doors 37, 39 that use track 40 to slide the roof doors 37, 39 inside of the cargo bed so said roof doors are substantially parallel to side panels 27, 24. FIG. 5 employs similar operation embodiment as FIG. 3 and FIG. 4 but consists of the same roof doors 16, 18 and said roof doors instead of sliding down an inside track 40, slide down exterior tracks 42, 44 so the roof door 18 is substantially parallel to side panel 24 on the exterior. Door attachment method, hardware, and weatherproofing will utilize those in the known exterior door art and interior pivot/track door art. Any number of door styles, hardware and opening methods could be used in the known arts previously mentioned as well as cabinetry art.

Although not illustrated, roof doors 16, 18, 37, 39 use methods common in cellar door art allowing roof doors to remain in varying fixed open positions in excess of 90 degrees. This allows an individual to open said roof doors 16, 18, 37, 39 for loading and unloading without having the need to fold the roof doors 16, 18, 37, 39 substantially parallel to the cap side panels 24, 27. Also not illustrated, top rear support member 20 swivels fully parallel to the inside or outside of the truck cap side panel 24 using known methods whereby an individual can load or unload cargo bed to avoid any overhead obstructions of the truck cap.

ALTERNATIVE EMBODIMENTS

The roof doors on the truck cap will use known technologies of various door designs and attaching mechanisms that can include but not limited to: hinges, pivot hinges 48 (FIG. 4), and track and roller systems. The rigid door material can include but is not limited to steel, aluminum, fiberglass, or other materials. Various fastening methods and hardware known in truck cap manufacturing will be used for attaching components. The door positioning, once fully opened in the various embodiments, can include but is not limited to folding the roof doors completely inside or outside the truck cap side panel. Other embodiments may take advantage of mechanisms that slide the roof doors along the interior or exterior side panels. Future embodiments may consist of metal doors that roll into a coil along a framing track and are stored adjacent to the truck cab rear or along the upper cross beams of the cap side panels. Another future embodiment may include a single folding roof door that folds and stores attached to a single truck cap side panel. Although not illustrated as such, this truck cap embodiment is unique to prior art as it can be more easily utilized for most existing truck cap designs that have side tool box storage areas. Additional embodiments may have a single rear access door above the tailgate as common in the art instead of the presently illustrated double rear access door structure. Future embodiments may also include variations without a tailgate where rear doors extend to the cargo bed floor. In addition to the manual opening and closing of the roof cap doors, the invention may employ the use of a motor and/or pulley system to further lessen physical effort of operating the roof doors. Some embodiments will also include a bi-fold roof door when using the hinge fold over method to allow roof doors to remain above side cargo bed walls when the roof doors are open substantially 270 degrees.

The invention claimed is:

1. A truck cap or vehicle cover:
   a. consisting of roof cap doors configured to provide full open access to a cargo bed, the truck cap or vehicle cover comprising mechanisms that permit
   b. said roof cap doors to remain attached to the truck cap in a position substantially parallel to truck cap side panels and configured to maintain storage and multiple side panel exterior functionality including the full open access to the the cargo bed while the roof cap doors remain attached to the truck cap;
   a top support beam; and
   a track built into or attached to the top support beam, wherein the roof cap doors are slidingly engaged along the track and along an exterior of a corresponding side panel of the truck cap so said roof doors are substantially parallel to the exterior of the truck cap side panels.

2. The truck cap of claim 1, wherein the roof cap doors have hinges configured to allow said roof cap doors to open to a substantially 270 degree angle and attach to corresponding side panels.

3. The truck cap of claim 1, wherein the roof cap doors are slidingly engaged along side support members of the truck cap so the roof cap doors are substantially parallel to an interior of the truck cap side panels.

4. The truck cap of claim 1, wherein said truck cap side panels include windows.

5. The truck cap of claim 1, wherein said roof cap doors are bifold doors, including at least one hinge between respective sections of the bi-fold doors.

6. The truck cap of claim 1, further comprising a cross beam attached to the top support beam, the cross beam configured to swivel parallel to the inside or outside of the truck cap side panel such that an individual can load or unload the cargo bed and avoid overhead obstructions of the truck cap.

7. A truck cap or vehicle cover, comprising:
   roof cap doors configured to provide full open access to a cargo bed;
   mechanisms attached to the roof cap doors that permit the roof cap doors to remain attached to the truck cap in a position substantially parallel to truck cap side panels and configured to maintain storage rack and multiple side panel exterior functionality including the full open access to the cargo bed while the roof cap doors remain attached to the truck cap;
   a top support beam; and
   a track built into or attached to the top support beam, wherein the roof cap doors are slidingly engaged along the track and along an exterior of a corresponding side panel of the truck cap so said roof doors are substantially parallel to the exterior of the truck cap side panels.

8. The truck cap of claim 7, wherein the roof cap doors have hinges configured to allow said roof cap doors to open to a substantially 270 degree angle and attach to corresponding side panels.

9. The truck cap of claim 7, wherein the roof cap doors are slidingly engaged along side support members of the truck cap so the roof cap doors are substantially parallel to an interior of the truck cap side panels.

10. The truck cap of claim 7, wherein said truck cap side panels include windows.

11. The truck cap of claim 7, wherein said roof cap doors are bi-fold doors each including at least one hinge between respective sections of the bi-fold door.

12. The truck cap of claim 7, further comprising a cross beam attached to the top support beam, the cross beam configured to swivel parallel to the inside or outside of the truck cap side panel such that an individual can load or unload the cargo bed and avoid overhead obstructions of the truck cap.

13. A truck cap or vehicle cover, comprising:
   roof cap doors configured to provide full open access to a cargo bed,
   mechanisms attached to the roof cap doors that permit the roof cap doors to remain attached to the truck cap in a position substantially parallel to truck cap side panels and configured to maintain storage rack and multiple side panel exterior functionality including the full open access to the cargo bed while the roof cap doors remain attached to the truck cap,
   top support beams, side support members, and a track built into or attached to the top support beams, wherein the roof cap doors are slidingly engaged along the track and along the side support members so the roof doors are substantially parallel to an interior of the truck cap side panels.

14. The truck cap of claim 13, wherein the roof cap doors have hinges configured to allow said roof cap doors to open to a substantially 270 degree angle and attach to corresponding side panels.

15. The truck cap of claim 13, wherein said truck cap side panels include windows.

16. The truck cap of claim 13, wherein said roof cap doors are bi-fold doors each including at least one hinge between respective sections of the bi-fold door.

17. The truck cap of claim 13, further comprising a cross beam attached to the top support beam, the cross beam configured to swivel parallel to the inside or outside of the truck cap side panel such that an individual can load or unload the cargo bed and avoid overhead obstructions of the truck cap.

* * * * *